United States Patent

[11] 3,625,967

[72] Inventor David G. Martin
Kalamazoo, Mich.
[21] Appl. No. 686,733
[22] Filed Nov. 29, 1967
[45] Patented Dec. 7, 1971
[73] Assignee The Upjohn Company
Kalamozoo, Mich.

[54] DERIVATIVES OF 1,4-DIHYDRO-3H-2,3-BENZOXAZINE
6 Claims, No Drawings

[52] U.S. Cl. .................................................. 260/244 R,
260/333, 260/453 AR, 424/248
[51] Int. Cl. .................................................. C07d 87/12
[50] Field of Search ........................................... 260/244

[56] References Cited
UNITED STATES PATENTS
2,661,272 12/1953 Searle........................... 260/553

OTHER REFERENCES

Migrdichian Organic Synthesis Vol. 1, page 448 N. Y., Reinhold, 1957 QD262.M55

Pifferi et al., Gazzetta Chimica Italiana Vol. 96, pages 1,671– 1,695 (1966, Dec.) QD1.G28.

Pifferi et al., Chem. Abst. Vol. 67, No. 43766e (1967) QD1.A51.

Wagner et al., Synthetic Organic Chemistry page 645 N. Y., Wiley, 1953 QD262.W24.

*Primary Examiner*—Natalie Trousof
*Attorneys*—Eugene O. Retter and John Kekich

ABSTRACT: 1,6-Dihydro-4-phenyl-2,5,3-benzodioxazocine (1), 1,4-dihydro-3H-2,3-benzoxazine-3-carboxamide (1'a), N-alkyl-1,4-dihydro-3H-2,3-benzoxazine-3-carboxamides (1'b), 1,4-dihydro-3H-2,3-benzoxazine-3-carboxamidine (1'c) and its acid addition salts, process for the preparation thereof and novel intermediates prepared by said processes. Compounds 1, 1'a, and 1'b principally exhibit antilipemic activity. Compound 1'c is useful for preparing mothproofing agents and inhibitors that can be used in the acid pickling of steel.

DERIVATIVES OF 1,4-DIHYDRO-3H-2,3-BENZOXAZINE

BRIEF SUMMARY OF THE INVENTION

This invention relates to novel compounds and processes for preparing the same. More particularly this invention relates to 1,6-dyhydro-4-phenyl-2,5,3-benzodioxazocine having the formula:

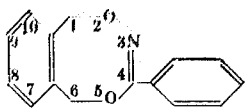

I and 1,4-dihydro-3H-2,3-benzoxazine derivatives having the formula:

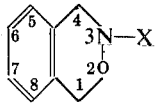

II wherein X is selected from the group consisting of

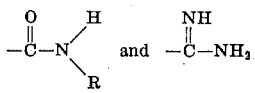

wherein R is alkyl gaving from one to four carbon atoms, inclusive, or hydrogen, and the acid addition salts of the compound wherein $$X \text{ is } -\overset{NH}{\underset{\parallel}{C}}-NH_2$$

The invention further relates to novel intermediates useful for preparing the compounds of formula 1'.

The novel products of this invention can be prepared from 1,4-dihydro-3H-2,3-benzoxazine hydrochloride in accordance with the following equations:

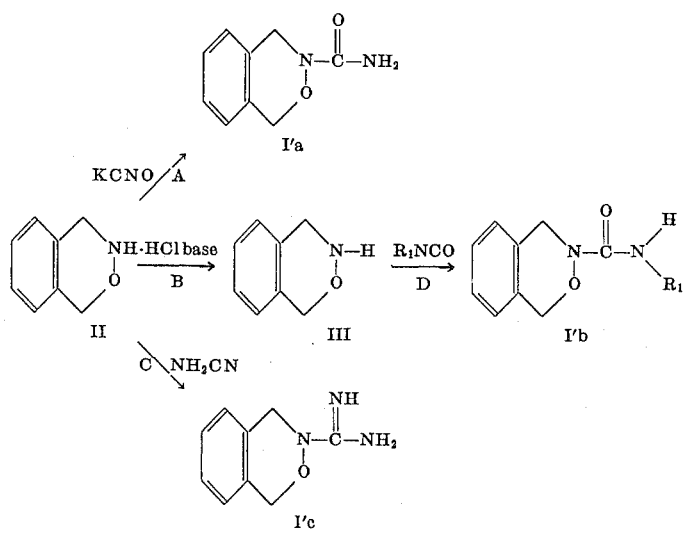

wherein $R_1$ is alkyl having from one to four carbon atoms, inclusive.

DETAILED DESCRIPTION

The starting 1,4-dihydro-3H-2,3-benzoxazine hydrochloride can be prepared from either and alkyl ester of 1,4-dihydro-3H-2,3-benzoxazine-3-carboxylic acid or 3-benzoyl-1,4-dihydro-3H-2,3-benzoxazine, both of which in turn can be prepared by reacting ortho-(bis-chloromethyl)benzene and the appropriate hydroxylamine derivative. Processes for preparing the starting hydrochloride are illustrated by the following equations:

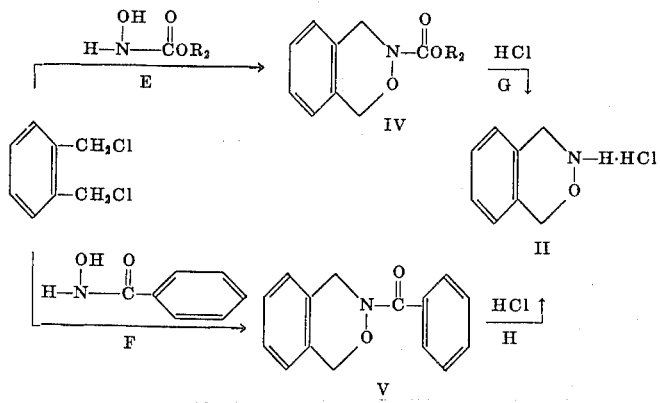

wherein $R_2$ is alkyl containing from one to four carbon atoms, inclusive.

The alkyl esters of 1,4-dihydro-3H-2,3-benzoxazine-3-carboxylic acid, Formula IV, are prepared by reacting ortho-(bis-chloromethyl)benzene with an alkyl hydroxycarbamate. The process is illustrated in the reaction designated above as reaction E. The reaction is conducted in the presence of a base and an inert solvent, for example, methanol, ethanol, isopropanol, and the like. The alkali-metal alkoxides, illustratively sodium ethoxide and sodium isopropoxide, are the preferred bases. The reactant ratios can vary over a wide range; however, the preferred ratio is one mole of ortho-(bis-chloromethyl)benzene, one mole of the carbamate, and two moles of the base. It has been found that this ratio reduces the occurrence of side reactions. The reaction is preferably conducted under reflux conditions to insure that the reaction proceeds at a reasonable rate and that the formation of byproducts is minimized; however, lower temperatures may be used if desired.

Separation of the product from the reaction mixture is easily accomplished by the conventional separation techniques such as evaporation, filtration and distillation.

The compound 3-benzoyl-1,4-dihydro-3H-2,3-benzoxazine (formula V) can be prepared by any of three methods. In the first method, it is prepared by reacting ortho-(bis-chloromethyl)-benzene with benzohydroxamic acid in the presence of a base and inert solvent, for example, methanol, ethanol, isopropanol, and the like. The base is preferably an alkali-metal alkoxide, illustratively sodium ethoxide or sodium isopropoxide. The process is illustrated by the following equation:

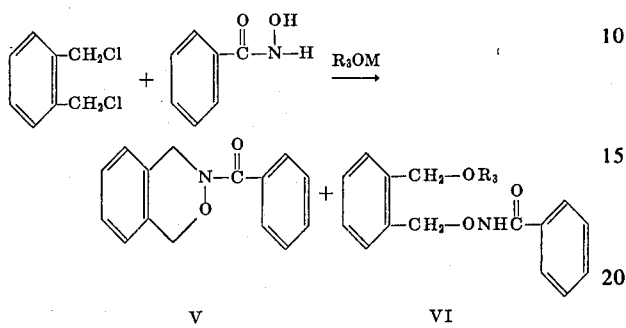

wherein $R_3$ is alkyl containing from one to four carbon atoms, inclusive, and M is a metal cation, preferably an alkali-metal cation. The preferred base for this reaction is sodium isopropoxide. The quantities of reactants used are one mole of the ortho-(bis-chloromethyl)benzene, one mole of the benzohydroxamic acid and two moles of base. A wide range of temperatures may be used, but it is preferred to operate under reflux conditions to reduce the occurrence of side reactions. In addition to 3-benzoyl-1,4-dihydro-3H-2,3-benzoxazine, this reaction yields 0-[o-(alkoxymethyl)benzyl]benzohydroxamic acid, formula VI, and other byproducts containing the

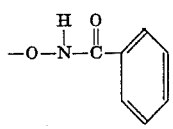

group. The desired product can be separated from byproducts either by chromatographic or extraction procedures.

The second method for preparing 3-benzoyl-1,4-dihydro-3 H-2,3-benzoxazine involves the reaction of one mole of ortho-(bis-chloromethyl)benzene with two moles of the alkali-metal salt of benzohydroxamic acid. This process is illustrated by the following equation:

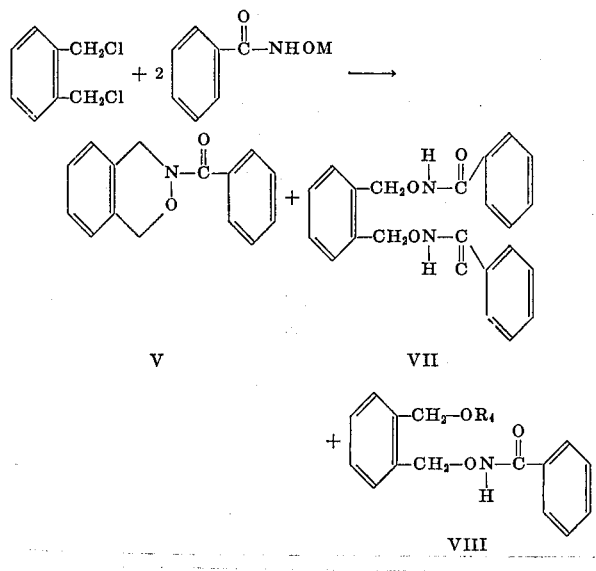

wherein $R_4$ is alkyl containing from one to four carbon atoms, inclusive, and M is a metal cation, preferably an alkali-metal cation. The reaction is most advantageously conducted under reflux conditions in the presence of an inert solvent, for example, methanol, ethanol, isopropanol, or the like. Byproducts formed in this reaction have structures illustrated by formulas VII and VIII.

A third method for preparing 3-benzoyl-1,4-dihydro-3H-2,3-benzoxazine involves the reaction of equimolar quantities of an alkali-metal benzohydroxamate, a base and ortho-(bis-chloromethyl)benzene. This reaction is most advantageously carried out by slowly adding an aqueous solution of the alkali-metal benzohydroxamate and base to a refluxing alcoholic solution (e.g. methanol, ethanol, isopropanol, and the like) of the ortho-(bis-chloromethyl)benzene. This method is illustrated by the following equation:

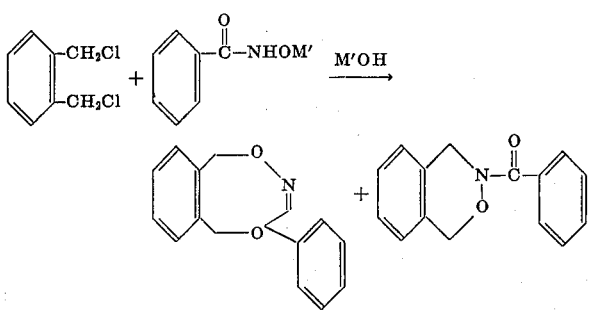

wherein M' is an alkali-metal cation. In addition to the 3-benzoyl-1,4-dihydro-3H-2,3-benzoxazine, this method yields the compound 1,6-dihydro-4-phenyl-2,5,3-benzodioxazocine (formula I). The 1,6-dihydro-4-phenyl-2,5,3-benzodioxazocine has exhibited antilipemic activity in animals.

The 1,4-dihydro-3H-2,3-benzoxazine hydrochloride (formula II) is obtained by reacting either the compound of formula IV or the compound of formula V with an anhydrous or aqueous solution of hydrogen chloride in an alkanol, as illustrated in reactions G and H. Suitable alkanols include methanol, ethanol, propanol, isopropanol, and the like. While the reaction is operable over a wide range of temperatures, e.g. 25° to 100° C., it is preferred to operate under reflux conditions to insure that the reaction proceeds at a reasonable rate and side reactions are minimized.

The details of the process for making the novel 1,4-dihydro-3H-2,3-benzoxazine derivatives of formula I' will vary depending on whether compound I'a, I'b, or I'c is being prepared.

The compound, 1,4-dihydro-3H-2,3-benzoxazine-3-carboxamide (I'a) is prepared by reacting an aqueous solution of 1,4-dihydro-3H-2,3-benzoxazine hydrochloride (II) with a metal cyanate as illustrated in reaction A. Although other metal cyanates can be used in this step, the alkali-metal cyanates are preferred because of their water solubility. Since the hydrochloride salt is also water soluble, the reaction readily takes place in an aqueous medium. This is advantageous because it eliminates (1) the step of converting the hydrochloride to its free base and (2) the need for utilizing some other solvent. While the reaction readily takes place at room temperature, it can be conducted over a wide range of temperatures, for example, 0° to 100° C. The reactant ratios can vary over a wide range, but the best results are obtained when an excess of alkali cyanate is used.

The N-alkyl-1,4-dihydro-3H-2,3-benzoxazine-3-carboxamides (I'b) can be prepared by converting 1,4-dihydro-3H-2,3-benzoxazine hydrochloride to its free base (III) by reacting an aqueous solution of the hydrochloride with a base, for example, an alkali-metal hydroxide, extracting the base with a solvent, e.g., ether, and then reacting the solution of free base with an alkyl isocyanate illustrated in reaction D.

The reaction between the alkyl isocyanate and the free base readily takes place at room temperature, but is can be conducted at temperatures below or above room temperatures, if desired. A wide range of reactant ratios can also be utilized but an excess of alkyl isocyanate is preferred. The reaction is advantageously carried out in an inert solvent, for example, diethyl ether, diisopropyl ether, benzene, toluene, methylene, chloride, ethyl acetate, and the like. The product can be recovered by conventional recovery techniques, for example, evaporation and crystallization.

The compound 1,4-dihydro-3H-2,3-benzoxazine-3-carboxamidine hydrochloride (I'c) is prepared by reacting 1,4-dihydro-3H-2,3-benzoxazine hydrochloride (II) with cyanamide, as is shown in reaction C. The reaction is advantageously conducted in the presence of an inert solvent, for example, benzene, toluene, xylene, etc. Although lower temperatures can be utilized, the reaction is preferably conducted under reflux conditions. Equimolar quantities of reactants or a slight excess of the cyanamide should be utilized. The product can be recovered from the reaction mixture by conventional recovery techniques.

It has been found that the novel compounds of this invention, represented by formulas I, I'a, I'b, II, III, and IV, are useful in the treatment of hyperlipemic states in animals. For example, they lower serum cholesterol and triglycerides. The compounds were administered orally to Sprague-Dawley male rats in dosages of 5 mg/kg. and higher. For example, at a dosage of 10 mg./kg., compound I'a reduced cholesterol and triglycerides 24 percent and 39 percent, respectively.

The compounds of formulas I'a and I'b exhibit sedative activity in animals. For example, the compound of formula I'a when administered to Rockland all-purpose albino mice, induces depression at dosages of 100 to 300 mg./kg. The $LD_{50}$ is 562 mg./kg. The compounds of formula I'b also exhibit antiinflammatory activity.

The compound of formula I is an effective insecticide for crickets at a concentration of 0.2 percent.

The compounds of formulas I and V have exhibited antifungal activity, for example, against *Blastomyces dermatitidis* and *Coccidioides immitis*.

For purposes of administration to mammals, including animals of economic value, such as horses, cattle, sheep, pigs, mice, rats, rabbits, and the like, the compounds can be combined with solid or liquid pharmaceutical carriers and formulated in the form of tablets, powder packets, capsules, and the like solid dosage forms, using starch and like excipients, or dissolved or suspended in suitable solvents or vehicles, for oral or parenteral administration.

The novel compound of formula I'c is a good vehicle for toxic acids. For example, the fluosilicic acid addition salt is useful as a mothproofing agent according to U.S. Pat. No. 2,205,789.

In addition, the compound of formula I'c can be converted to the thiocyanic acid addition salt and condensed with formaldehyde to form resins which are useful as inhibitors according to U.S. Pat. Nos. 2,425,320 and 2,606,155 in the acid pickling of steel.

The following examples are set forth to illustrate the products and processes of the present invention and are not intended to limit the scope thereof.

EXAMPLE 1

N-Methyl-1,4-dihydro-3H-2,3-benzoxazine-3-carboxamide
A. 1,4-Dihydro-3H-2,3-benzoxazine-3-carboxylic acid ethyl ester Sodium hydride (55 g. of 55 percent sodium hydride mineral oil dispersion; 1.25 moles) was cautiously dissolved in 1 l. of absolute ethanol with stirring and cooling under an atmosphere of nitrogen. Ethyl hydroxycarbamate (64.2 g., 0.61 mole) was added to the cold sodium ethoxide solution. The resulting solution was kept in the ice bath while 100 ml. portions of it were added slowly through a dropping funnel to a stirred, refluxing solution of 108.2 g. (0.62 mole) of ortho-(bis-chloromethyl)benzene in 1 l. of ethanol. The addition required about 2 hrs., after which the reaction mixture was refluxed for an additional 1.75 hrs. After stirring overnight at room temperature, salts were removed by filtration and washed with ethanol. The filtrate was evaporated to dryness under reduced pressure, and the residue taken up in ether, washed with water, 5 percent potassium hydroxide, water, 5 percent hydrochloric acid, and water, dried over magnesium sulfate, and evaporated to dryness under reduced pressure. The residue consisted of two layers; the upper layer was essentially pure mineral oil and was siphoned off. The lower layer was distilled under reduced pressure (0.5 mm. Hg.). Initially a forerun (15.52 g.) distilling 65°–85° C. was collected and discarded. This was followed by a fraction (3.21 g.) distilling 85°–110b*L* C. which was a mixture of nonnitrogeneous material and 1,4-dihydro-3H-2,3-benzoxazine-3-carboxylic acid ethyl ester. This in turn was followed by 1,4-dihydro-3H-2,3-benzoxazine-3-carboxylic acid ethyl ester (52.35 g.) distilling 112°–119° C. Spectra (IR, UV, NMR) were consistent with the structure.

Anal.Calcd. for $C_{11}H_{13}NO_3$:     C, 63.75; H, 6.32; N, 6.76.
Found:     C, 63.70; H, 6.33; N, 6.54.

The 1,4-dihydro-3H-2,3-benzoxazine-3-carboxylic acid methyl, propyl and butyl esters can be prepared in the same manner by substituting methyl, propyl and butyl hydroxycarbamates for the ethyl hydroxycarbamate and the corresponding alcohols for ethanol in the above procedure.

B. 1,4-Dihydro-3H-2,3-benzoxazine hydrochloride

A solution of 47.25 g. (0.228 mole) of 1,4-dihydro-3H-2,3-benzoxazine-3-carboxylic acid ethyl ester in 480 ml. of methanol, 190 ml. of water, and 190 ml. of concentrated hydrochloric acid was refluxed for 19 hrs. and evaporated to dryness under reduced pressure. The crystalline residue was washed thoroughly with ether, affording 33.1 g. (85 percent), m.p. 181°–184° C. of 1,4-dihydro-3H-2,3-benzoxazine hydrochloride.

C. 1,4-Dihydro-3H-2,3-benzoxazine

An aqueous solution of 5.0 g. of 1,4-dihydro-3H-2,3-benzoxazine hydrochloride was basified with sodium hydroxide, diluted with a saturated sodium chloride solution and extracted with ether to yield an ethereal solution of 1,4-dihydro-3H-2,3-benzoxazine. This compound was isolated by evaporating the ethereal solution to dryness.

D. N-Methyl-1,4-dihydro-3H-2,3-benzoxazine-3-carboxamide

An ethereal solution of 1,4-dihydro-3H-2,3-benzoxazine, prepared as in part C, was dried over a potassium carbonate-magnesium sulfate mixture, treated with 5 ml. of methyl isocyanate, and allowed to stand overnight at room temperature. The solid present was collected, washed with a little ether and dried, affording 1.89 g., m.p. 108.5°–109° C., of N-methyl-1,4-dihydro-3H-2,3-benzoxazine-3-carboxamide. Crystallization of the ethereal filtrate residue from a mixture of acetone and cyclohexane afforded crops of 3.2 g., m.p. 108°–108.5° C. and 0.2 g., m.p. 107°–108.5° C. of additional product. Recrystallization of these solids from a mixture of acetonecyclohexane afforded 4.93 g., m.p. 107°–107.5° C., of analytically pure N-methyl-1,4-dihydro-3H-2,3-benzoxazine-3-carboxamide. Spectra (IR, UV, NMR) were consistent with structure.

Anal.
Calcd. for $C_{16}H_{13}N_3O_2$:   C, 62.48; H, 6.29; N, 14.58.
Found: C, 62.46; H, 6.18; N, 14.52.

EXAMPLE 2

N-Ethyl-1,4-dihydro-3H-2,3-benzoxazine-3-carboxamide

This product was prepared by utilizing substantially the same methods utilized in example 1, except that in step D ethyl isocyanate was substituted for methyl isocyanate. An ethereal solution of free base from 5.0 g. of 1,4-dihydro-3H-2,3-benzoxazine hydrochloride was treated with 5 ml. of ethyl isocyanate and stored overnight at room temperature. The solution was evaporated to dryness under reduced pressure; recrystallization of the residue from a mixture of acetone and Skellysolve B hexanes afforded crops of 4.14 g., m.p. 75.5°–76° C., and 0.82 g., m.p. 74.5°–75° C. of N-ethyl-1,4-dihydro-3H-2,3-benzoxazine-3-carboxamide. A sample recrystallized from a mixture of acetone and cyclohexane for analysis melted at 74.5°–75° C. Spectra (IR, UV, NMR) were consistent with the structure.

Analysis
Calcd. for $C_{11}H_{14}N_2O_2$:
   C, 64.06; H, 6.84; N, 13.58.
Found:   C, 63.68; H, 6.89; N, 13.34.

Using the same procedure as above, but replacing ethyl isocyanate by propyl isocyanate and butyl isocyanate, there are obtained N-propyl-1,4-dihydro-3H-2,3-benzoxazine-3-carboxamide and N-butyl-1,4-dihydro-3H-2,3-benzoxazine-3-carboxamide.

EXAMPLE 3

3,4-Dihydro-1H-2,3-benzoxazine hydrochloride
A. 3-Benzoyl-1,4-dihydro-3H-1,3-benzoxazine To a stirred solution of sodium isopropoxide (9.0 g. of 56 percent sodium hydride in mineral oil in 1.0 l. of isopropanol, 0.21 mole) was added a solution of 13.7 g. (0.1 mole) of benzohydroxamic acid in 300 ml. of isopropanol and 17.5 g. (0.1 mole) of ortho-(bis-chloromethyl)benzene in 200 ml. of isopropanol. The reaction mixture was stirred and refluxed for 19 hours and then filtered hot through Celite (infusorial earth). The filtrate was evaporated to dryness under reduced pressure and the residue was taken up in methylene chloride, washed with water, dried over sodium sulfate and concentrated on a steam bath. The methylene chloride was completely displaced with cyclohexane and the hot mixture (some solid present) filtered through infusorial earth. The filtrate was evaporated to dryness, leaving 26 g. of residue which was chromatographed on a column of silica gel (3 l.) with 20 percent acetone in cyclohexane. Fractions of 75 ml. were collected. Essentially homogeneous 3-benzoyl-1,4-dihydro-3H-2,3-benzoxazine was found in fractions 48 through 51. Successive recrystallization of this material from a mixture of methylene chloride and Skellysolve B hexanes, and aqueous methanol, yielded the purified compound; melting point 85°–85.5° C. The structure was supported by NMR, IR, and UV spectral data.

Analysis
Calcd. for $C_{15}H_{13}NO_2$:
   C, 75.30; H, 5.48; N, 5.85.
Found:   C, 75.23; H, 5.79; N, 5.86.

Fractions 62–75 contained a homogeneous viscous oil identified as O-[o-(isopropoxymethyl)benzyl]benzohydroxamic acid (formula VI) on the basis of its IR and NMR spectra.

3-Benzoyl-1,4-dihydro-3H-2,3-benzoxazine can be isolated without chromatography by virtue of the fact that the contaminants can be extracted from an ethereal solution with aqueous sodium hydroxide. Such an extraction procedure afforded, after crystallization from a mixture of methylene chloride and Skellysolve B hexanes, 3-benzoyl-1,4-dihydro-3H-2,3-benzoxazine, m.p. 84.5°–86.5° C.

B. 1,4-Dihydro-3H-2,3-benzoxazine hydrochloride

3-Benzoyl-1,4-dihydro-3H-2,3-benzoxazine (2.54 g.) was dissolved in isopropanol (100 ml.) and treated with 25 ml. of 6 N hydrogen chloride in isopropanol. The solution was refluxed for 2¼ hrs. and the solvent was evaporated under reduced pressure. The residue was triturated and washed thoroughly with ether, affording 1.50 g. of 1,4-dihydro-3H-2,3-benzoxazine hydrochloride, m.p. 171°–174° C. Recrystallization from a methanolethyl acetate mixture afforded 1.45 g. (80 percent) of analytically pure product, m.p. 180.5°–182.5° C. Spectral data (NMR, IR, UV) supported the structural assignment.

Analysis
Calcd. for $C_8H_9NO \cdot HCl$
   C, 55.98; H, 5.87; N, 8.16; Cl, 20.66.
Found:   C, 56.17; H, 6.26; N, 8.44; Cl, 20.57.

EXAMPLE 4

3-Benzoyl-1,4-dihydro-3H-2,3-benzoxazine

A solution of 108 g. of benzohydroxamic acid in 788 ml. of 1N sodium hydroxide and 500 ml. of 95 percent ethanol was added to a warm solution of 68.9 g. of ortho-(bis-chloromethyl)benzene in 1.10 l. of 95 percent ethanol. The clear solution was refluxed overnight and then concentrated to a small volume under reduced pressure, leaving an aqueous suspension of a solid and gum which were separated and washed with water and then thoroughly with ether, leaving 33.8 g. (23 percent of ortho-(bis-benzamidooxymethyl)benzene methyl)benzene (formula VII), m.p. 190°–191.5° C. An analytical sample recrystallized from ethanol melted at 193°–193.5° C.

Analysis
Calcd. for $C_{22}H_{20}N_2O_4$:
   C, 70.20; H, 5.36; N, 7.44.
Found:   C, 70.44; H, 5.20; N, 7.27.

The ether washings of the filtrate were washed with five portions of sodium hydroxide, and with water and dried over magnesium sulfate. Crystallization from a 1:1 mixture of ether and Skellysolve B hexanes afforded 46 g. (49 percent of crude 3-benzoyl-1,4-dihydro-3H-2,3-benzoxazine, m.p. 68°–80° C. This crude product was crystallized from a mixture of acetone and Skellysolve B hexanes to yield pure 3-benzoyl-1,4-dihydro-3H-2,3,-benzoxazine, m.p. 84°–84.5° C.

EXAMPLE 5

1,6-Dihydro-4-phenyl-2,5,3-benzodioxazocine

Potassium benzohydroxamate (1.75 g., 0.01 mole) was dissolved in 50 ml. of water with vigorous shaking. To this solution was added 30 ml. of ice and 10 ml. of 1N sodium hydroxide. After agitation, the resulting cold solution was added dropwise to a refluxing solution of 1.75 g. (0.01 mole) of ortho-(bis-chloromethyl) benzene in 30 ml. of isopropanol. During the addition two 10-ml. portions of isopropanol were added for clarification of the reaction mixture. After the addition was completed, the reaction mixture was cooled and concentrated under reduced pressure to remove the isopropanol. The aqueous residue was extracted with ether, and the extract was washed with two portions of dilute sodium hydroxide followed by two portions of water, dried over magnesium sulfate and evaporated, leaving 1.90 g. of residue which by thin layer chromatography analysis was found to be a mixture of substantially equal amounts of 3-benzoyl-1,4-dihydro-3H-2,3-benzoxazine and a material of slightly greater mobility on silica gel. This residue was chromatographed on 200 g. of silica gel with 10 percent acetone in cyclohexane collecting 40 ml. fractions. Fractions 9–11 (0.44 g. total) had the same mobility as the faster moving spot of the crude residue; recrystallization from a mixture of acetone and Skellysolve B hexanes gave 0.29 g., m.p. 104°–106° C., of 1,6-dihydro-4-phenyl- 2,5,3-benzodioxazocine. A sample of 1,6-dihydro-4-phenyl-2,5,3-benzodioxazocine recrystallized from methylene chloride-isopropanol for analysis, melted 107°–109° C. Spectra (IR, UV, NMR) were consistent with the structure.

Analysis
Calcd. for $C_{15}H_{13}NO_2$:
C, 75.30; H, 5.48; N, 5.85.
Found: C, 75.45; H, 5.33; N, 5.91.

EXAMPLE 6

1,4-Dihydro-3H-2,3-benzoxazine-3-carboxamide

To an aqueous solution of 3.0 g. of 1,4-dihydro-3H-2,3-benzoxazine hydrochloride (example 1, part B) was added 3.0 g. of potassium cyanate. The suspension which formed immediately was stirred briefly, and the solid was collected, washed with water and dried, affording 2.92 g. of product, m.p. 173°–175° C. Successive recrystallization from aqueous acetone and a mixture of acetone and Skellysolve B hexanes afforded an analytical sample of 1,4-dihydro-3H-2,3-benzoxazine-3-carboxamide, m.p. 176°–177.5° C. Spectra (IR, UV, NMR) supported the structure.

Analysis
Calcd. for $C_9H_{10}N_2O_2$: C, 60.66; H, 5.66; N, 15.72.
Found: C, 60.55; H, 6.04; N, 15.83.

EXAMPLE 7

1,4-Dihydro-3H-2,3-benzoxazine-3-carboxamidine and hydrochloride thereof

A suspension of 3.0 g. of 1,4-dihydro-3H-2,3-benzoxazine hydrochloride (example 1, part B) and 0.74 g. of cyanamide in toluene was stirred and refluxed under nitrogen for 1 hour. The solid had all melted before reflux temperature had been attained and after 20 min. of refluxing a new solid had formed. After allowing the suspension to cool, the solid was collected, washed with benzene, and dried, affording 3.72 g. of product melting at 151°–155° C. with previous sintering. Two recrystallizations from a mixture of methanol and ethyl acetate, gave 3.25 g. of 1,4-dihydro-3H-2,3-benzoxazine-3-carboxamidine hydrochloride solvated with methanol, ethyl acetate and water, and melting at 158°–160° C. with previous sintering. A sample was dried at 100° C. to obtain unsolvated 1,4-dihydro-3H-2,3-benzoxazine-3-carboxamidine hydrochloride.

Analysis
Calcd. for $C_9H_{11}N_3O \cdot HCL$
C, 50.59; H, 5.66; N, 19.66; Cl, 16.60.
Found: C, 50.35; H, 6.14; N, 19.94; Cl, 16.28.

The free base is prepared by basifying the hydrochloride with aqueous sodium hydroxide, extracting with methylene chloride, and evaporating the extract to dryness.

I claim:
1. A compound of the formula

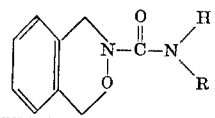

wherein R is alkyl of one to four carbon atoms, inclusive, or hydrogen.

2. A compound according to claim 1 wherein R is hydrogen.
3. A compound according to claim 1 wherein R is alkyl of one to four carbon atoms, inclusive.
4. A compound of claim 1 wherein R is methyl.
5. A compound of claim 1 wherein R is ethyl.
6. A compound of the formula:

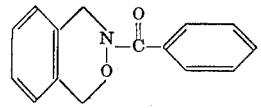

* * * * *